United States Patent
Bollinger et al.

(10) Patent No.: US 7,113,500 B1
(45) Date of Patent: Sep. 26, 2006

(54) METHOD AND DIAL PLAN FOR PACKET BASED VOICE COMMUNICATIONS FUNCTIONALITY

(75) Inventors: William E. Bollinger, Naperville, IL (US); Gary A. Refka, Mt. Prospect, IL (US)

(73) Assignee: Insors Integrated Communications, Chicago, IL (US)

( * ) Notice: Subject to any disclaimer, the term of this patent is extended or adjusted under 35 U.S.C. 154(b) by 1153 days.

(21) Appl. No.: 09/706,025

(22) Filed: Nov. 3, 2000

(51) Int. Cl.
*H04L 12/66* (2006.01)

(52) U.S. Cl. .................. 370/352; 370/238; 370/248; 379/221.01

(58) Field of Classification Search ......... 370/351–356, 370/400, 401, 235, 238, 248, 420, 466, 389; 379/219, 221.01, 211.01, 201.01, 209.01; 709/249
See application file for complete search history.

(56) References Cited

U.S. PATENT DOCUMENTS

| | | | |
|---|---|---|---|
| 4,191,860 A | 3/1980 | Weber | |
| 4,987,587 A | 1/1991 | Jolissaint | |
| 4,992,940 A | 2/1991 | Dworkin | |
| 5,260,866 A | 11/1993 | Lisinski et al. | |
| 5,303,297 A | 4/1994 | Hillis | |
| 5,359,649 A | 10/1994 | Rosu et al. | |
| 5,381,403 A | 1/1995 | Maher et al. | |
| 5,493,490 A | 2/1996 | Johnson | |
| 5,499,357 A | 3/1996 | Sonty et al. | |
| 5,513,171 A | 4/1996 | Ludwiczak et al. | |
| 5,533,108 A | 7/1996 | Harris et al. | |
| 5,615,342 A | 3/1997 | Johnson | |
| 5,661,790 A * | 8/1997 | Hsu ............... | 379/209.01 |
| 5,687,223 A | 11/1997 | Elliott et al. | |
| 5,703,938 A | 12/1997 | Lucas et al. | |
| 5,751,712 A | 5/1998 | Farwell et al. | |
| 5,752,238 A | 5/1998 | Dedrick | |
| 5,768,352 A | 6/1998 | Elliott et al. | |
| 5,828,737 A | 10/1998 | Sawyer | |

(Continued)

OTHER PUBLICATIONS

"MCLeod USA Business Services, Fax Packet," believed published circa Feb. 1997.

(Continued)

*Primary Examiner*—Dang Ton
*Assistant Examiner*—Melanie Jagannathan
(74) *Attorney, Agent, or Firm*—Greer, Burns & Crain, LTD

(57) ABSTRACT

A dial plan for a gateway in a packet based voice system provides call re-direct functionality to the system. The dial plan allows a gateway to process all incoming and outgoing calls for an enterprise, thereby minimizing required interface with an existing PBX. The dial plan identifies a given call as an incoming call from a data network, an incoming call from the PSTN, or an outgoing call from the PBX at an enterprise. The dial plan further identifies a desired route for transmitting the call to a desired destination. If the desired route is over a data network, the dial plan tests the route to determine its availability, and if it is not available determines an alternate re-direct route over the PSTN.

21 Claims, 7 Drawing Sheets

U.S. PATENT DOCUMENTS

| | | | |
|---|---|---|---|
| 5,842,178 A | | 11/1998 | Giovannoli |
| 5,914,945 A | | 6/1999 | Abu-Amaru et al. |
| 5,918,213 A | | 6/1999 | Bernard et al. |
| 5,933,490 A | * | 8/1999 | White et al. ............ 379/221.01 |
| 5,999,274 A | | 12/1999 | Lee et al. |
| 6,005,926 A | | 12/1999 | Mashinsky |
| 6,011,838 A | | 1/2000 | Cox |
| 6,011,844 A | | 1/2000 | Uppaluru et al. |
| 6,055,227 A | | 4/2000 | Lennert et al. |
| 6,061,556 A | | 5/2000 | Rahman |
| 6,141,345 A | * | 10/2000 | Goeddel et al. ............. 370/389 |
| 6,175,565 B1 | * | 1/2001 | McKinnon et al. ......... 370/354 |
| 6,215,783 B1 | | 4/2001 | Neyman |
| 6,253,249 B1 | * | 6/2001 | Belzile ....................... 709/249 |
| 6,275,574 B1 | * | 8/2001 | Oran ..................... 379/201.01 |
| 6,332,129 B1 | | 12/2001 | Walker et al. |
| 6,385,301 B1 | | 5/2002 | Nolting et al. |
| 6,389,005 B1 | * | 5/2002 | Cruickshank ................ 370/352 |
| 6,510,219 B1 | * | 1/2003 | Wellard et al. ......... 379/221.01 |
| 6,535,591 B1 | | 3/2003 | Galich et al. |
| 6,556,565 B1 | * | 4/2003 | Ward et al. .................. 370/356 |
| 6,574,216 B1 | * | 6/2003 | Farris et al. ................. 370/352 |

2002/0167943 A1    11/2002    Hakim et al.

OTHER PUBLICATIONS

Dialogic, an Intel Co., "Voice–Enabled Internet Call Centers in the Network," published on the world wide web, circa Jun. 1999.

Technology Marketing Co., "The Uncentered Call Center: Building Distributed Or Virtual Call Centers With CTI and Internet Telephony," published on the world wide web May 1999.

Terrence P. McGarty, "The Internet Protocol (IP) and Global Telecommunications Transformation," Mar. 1999.

Joseph P. Bailey et al., "Critical Business Decisions for Internet Services," Information Resources Mgmt. Ass. International Conf., 1998.

Dr. Lee W. McKnight et al., "Internet Telephony: Costs, Pricing, and Policy," Telecom. Policy Res. Conf., 1997.

David D. Clark, "A Taxonomy of Internet Telephony Applications," Internet Telephony Consortium, Massachusetts Institute of Technology, believed published circa 1998.

* cited by examiner

METHOD AND DIAL PLAN FOR PACKET BASED VOICE COMMUNICATIONS FUNCTIONALITY

FIELD OF THE INVENTION

The present invention relates to transmitting voice calls in a packet format over a data network. In particular, the present invention relates to dial plans and methods for providing call re-direct functionality to packet-based voice network configurations.

BACKGROUND OF THE INVENTION

Wide area networks (WAN) and local area networks (LAN) are being increasingly relied upon to carry voice communications in packet format. Technologies such as voice over intenet protocol (VoIP), voice over frame relay (VOFR) and voice over asynchronous transfer mode (VoATM) have been adopted for carrying the packetized voice signals. Such transmission generally provides for substantially reduced costs over traditional circuit switched voice transmissions. A particular application where packet voice systems have proved advantageous is for use by an enterprise to communicate between facilities and thereby avoid traditional circuit switched phone network toll charges.

To facilitate carrying of voice in packet format in such an application, gateways may be interfaced between existing phone systems and data networks. The gateways may convert signals between standard phone signals and packet based format. The gateways also provide routing instructions for the call signals, as well as providing various other functions.

FIG. 1 illustrates a simplified enterprise based network configuration for sending voice in a packet format. Acme Co. phone 2 in Chicago is connected through PBX 4 for calls to external phone 6 over LEC 8 ("Local Exchange Carrier") 8. LEC charges of course apply to such calls. Packet based transmission of calls can be made over an Acme Co. data network to other intra-company phones to avoid tolls associated with use of LEC 8, IXC 10 ("Inter Exchange Carrier"), and LEC 12. For an intra-company call from Acme Chicago phone 2 to Acme Houston phone 14, for example, gateway 16 converts the call signal to a packet format, and routes the call over Acme WAN 18 to Houston gateway 20. Gateway 20 in turn converts the call back to a standard format and sends it to PBX 22 for transmittal to phone 14. Calls between Acme phones 2 and 14 can thereby be made without associated LEC or IXC charges.

In addition, a method of calling off-company-network ("off-net") phones known as "leaking" can be used to save additional fees. As an example, leaking may be used to complete a call from Acme Chicago phone 2 to external phone 24 located near Houston without incurring charges from LEC 8 or IXC 10. The call to external phone 24 from phone 2 is converted to a packet format at gateway 16, routed over WAN 18 to Acme Houston, converted back to a standard format at gateway 20, and routed to PBX 22. Gateway 20 then instructs PBX 22 to send the call over LEC 12 to external phone 24. Only charges associated with LEC 12 are thus encountered.

In order to process calls for intra-company or leaking purposes, the gateways 16 and 20 may use what is generally known as a dial plan. A dial plan provides instruction for assigning network addresses and routing instructions to particular phone extensions, so that a dialed phone number may be translated into a data network address and route by the network. These routing instructions and addresses may be referred to as "dial peers".

The dial plan thereby processes incoming calls and provides instructions on how to route the call to a desired destination.

Configurations as illustrated in FIG. 1 and as described above are generally known in the art. There are several heretofore-unresolved problems with such configurations and methods, however .

A first problem involves a scenario that is known as "re-direct". When a call is routed from PBX 4 to router 16 for transmission over WAN 18, router 16 may determine that no downstream capacity is available to carry the call (if for instance router 20 or some element in WAN 18 is down). This may result in a fast busy signal to the caller, with no logic provided for rerouting the call back to PBX 4 for alternate path transmission over LEC 8.

Attempts to resolve this problem have been made. Specifically, some recently commercially available PBX's do provide logic for redirect functionality. In addition, upgrade "kits" can be incorporated in existing PBX's to enable these capabilities. These new PBX's and/or the upgrade kits, however, tend to be expensive. Many packet-based transmission configurations are retro-fitted onto existing PBX's that do not have this functionality. Replacement of the existing PBX with the more expensive newer model is not practical. This proposed solution is therefore disadvantageous.

A second solution to this problem has been proposed. Specifically, it has been proposed to connect gateway 16 to LEC 8 as illustrated by dashed line of FIG. 1. Calls that would otherwise be terminated because of a downstream problem may now be re-routed over LEC 8 by gateway 16. This second proposed solution, however, leaves several problems unresolved. As a first, it will require a dial plan providing re-direct logic. To date, no adequate dial plans are known. Also, the proposed solution requires a second connection to LEC 8. This connection requires effort to install and maintain, and requires a monthly charge. In addition, this second proposed solution may require some functionality and programming of PBX 4. Some PBX's, particularly older PBX's, may not be able to be configured for this solution.

Further, even if the PBX has this functionality, programming of the PBX requires effort and knowledge of the system. This places a burden on the gateway installer, particularly when considering the multiplicity of existing PBX's. It is impractical to burden the gateway installer with acquiring working knowledge of all of these different PBX's.

Another unresolved problem with the general configuration of a packet based phone system as illustrated in FIG. 1 has to do with leaking. Currently, leaking a call from phone 2 to external phone 14 requires interface with and transmission through PBX 22, as discussed above. This inevitably requires programming and physical configuration of PBX 22. This in turn requires working knowledge of PBX 22. As discussed above, such a requirement is disadvantageous in that a multiplicity of PBX's exists. It is burdensome and impractical for the gateway installer to have working knowledge of all different existing PBX's.

In addition to problems associated with re-direct functionality, further problems in the art relate to dial plans. Many dial plans that have been proposed for solving packet based voice system functionality problems require special dialing instructions. As an example, a caller from phone 2 may be required to dial "#99" to signal to PBX 4 or to gateway 16 that the call should be routed over WAN 18. Such dial plans are disadvantageous in that any additional dialing requirements for the user are inconvenient and often result in a lower utilization rate. Again referring to the Acme configuration of FIG. 1 by way of example, an Acme employee may not remember or care to go to the effort of learning dial plan dialing instructions for using the packet based voice system, and may instead simply go on using the familiar PSTN based dialing and thereby not take advantage of any cost savings available.

Heretofore unresolved problems therefore exist with regards to providing functionality for packet based phone configurations.

OBJECTS OF THE INVENTION

It is an object of the invention to provide a method for call re-direct for a packet based voice system.

It is a further object of the invention to provide a dial plan for a packet based voice system.

It is a still further object of the invention to provide an article for comprising a dial plan for a packet based voice.

SUMMARY OF THE INVENTION

The present invention comprises a method for providing call re-direct functionality to a packet based voice system, wherein the system has at least a gateway connected to a PBX, the gateway connected to a data network, the gateway connected to a PSTN. The method comprises the steps of disconnecting the PBX from the PSTN, connecting the gateway to the PSTN, programming the gateway to receive and determine a desired route for transmission of all incoming and outgoing calls including but not limited to all incoming calls from the PSTN, all incoming calls from the data network, and all outgoing calls from the PBX, and programming the gateway to transmit the call over the desired route if the desired route is over the PSTN or the PBX. If the desired route is over the data network, the method also comprises the steps of programming the gateway to determine if the desired route is available for transmission, transmitting the call if the desired route is available, and if the desired route is not available determining a desired route over the PSTN and transmitting the call over the PSTN. Preferably, the method of the invention also comprises the steps receiving a call, querying the call for a termination number, and truncating the termination number for transmission.

In a first embodiment of the method of the invention, the step of programming the gateway to receive and determine a desired route for all incoming and outgoing calls comprises programming the gateway to execute a dial plan. The dial plan preferably comprises the steps of receiving a call and querying the call for a termination number, and using the termination number to determine if the call is:

an intra-company inbound call coming over the data network wherein a desired route is determined to be over the PBX, a leaking call coming over the network wherein a desired route is determined to be over the PSTN, an inbound leaking call coming over the data network wherein a desired route is determined to be over the PSTN, or an outbound leaking call coming from the PBX wherein a desired route is determined to be over the data network.

Through the method of the invention, a packet based voice system may thereby be provided with re-direct functionality that solves many of the heretofore unresolved problems in the art. In particular, the gateway is enabled to re-direct calls over the PSTN when it determines that the desired route over the data network is not available. Further, this is advantageously accomplished without requiring any interface with the PBX, thereby reducing the cost and effort associated with the re-direct solution.

The method of the invention also eliminates the expense of maintaining two connections with the PSTN as the PBX is disconnected from the PSTN. To accomplish this, the method of the invention requires a dial plan that will process all incoming and outgoing calls. That is, the gateway must functionally replace the PBX as the "front line" connection with all external telephone communications and must process incoming calls from the WAN and the PSTN as well as outgoing calls from the PBX. Dial plans of the prior art do not provide such processing capabilities.

The current invention further comprises a dial plan for use with a gateway in a packet based voice system. The gateway is connected to a PBX serving an enterprise, to a data network, and to a PSTN. The dial plan generally comprises: programming the gateway to perform the steps of receiving a call, querying the call for a termination number, using the termination number to determine if the call should be routed over the PSTN, PBX, or data network, programming the gateway to determine the availability of the desired route if the desired route is over the data network, and programming the gateway to determine a re-direct route for the call over the PSTN if the desired route over the data network is not available.

Preferably, the dial plan of the current invention further comprises using the call termination number to determine if the call is:

an intra-company call from the data network wherein a desired route is over the PBX;

a leaking call from the data network wherein a desired route is over the PSTN;

a leaking call from the PBX wherein a desired route is over the data network; or a leaking call from the PBX wherein a desired route is over the PSTN.

The dial plan of the invention thereby provides the functionality to process all incoming and outgoing calls, and to re-direct calls from an unavailable data network route over the PSTN. In so doing, the dial plan of the invention solves many of the heretofore unresolved problems of the prior art.

The above brief description sets forth rather broadly the more important features of the present disclosure so that the detailed description that follows may be better understood, and so that the present contributions to the art may be better appreciated. There are, of course, additional features of the disclosure that will be described hereinafter which will form the subject matter of the claims appended hereto. In this respect, before explaining the several embodiments of the disclosure in detail, it is to be understood that the disclosure is not limited in its application to the details of the construction and the arrangements set forth in the following description or illustrated in the drawings. The present invention is capable of other embodiments and of being practiced and carried out in various ways, as will be appreciated by those skilled in the art. Also, it is to be understood that the phraseology and terminology employed herein are for description and not limitation.

DETAILED DESCRIPTION

Figure 1:
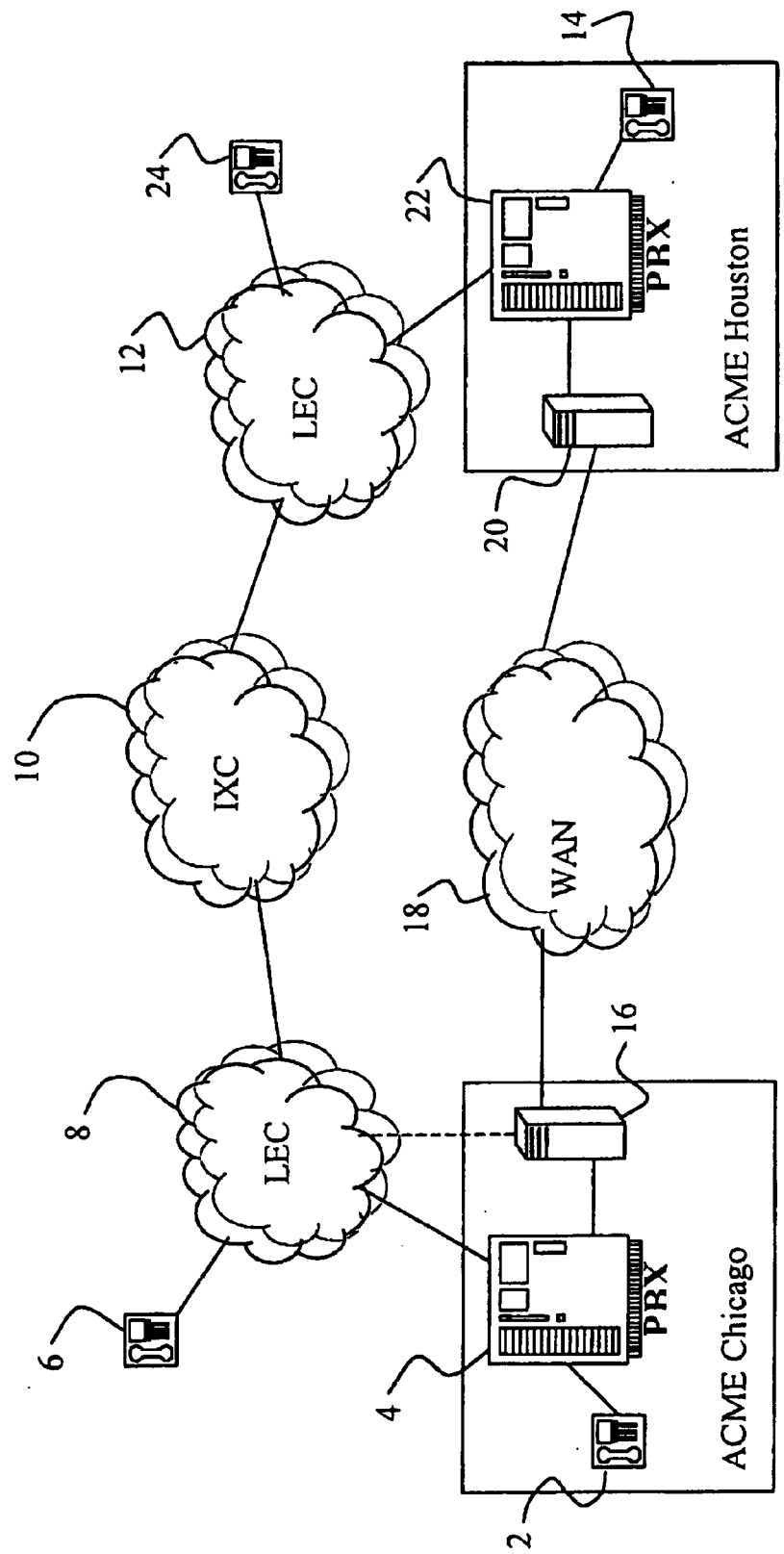
FIG. 1 is a schematic of a voice over packet network configuration as it generally exists in the prior art.
Figure 2:
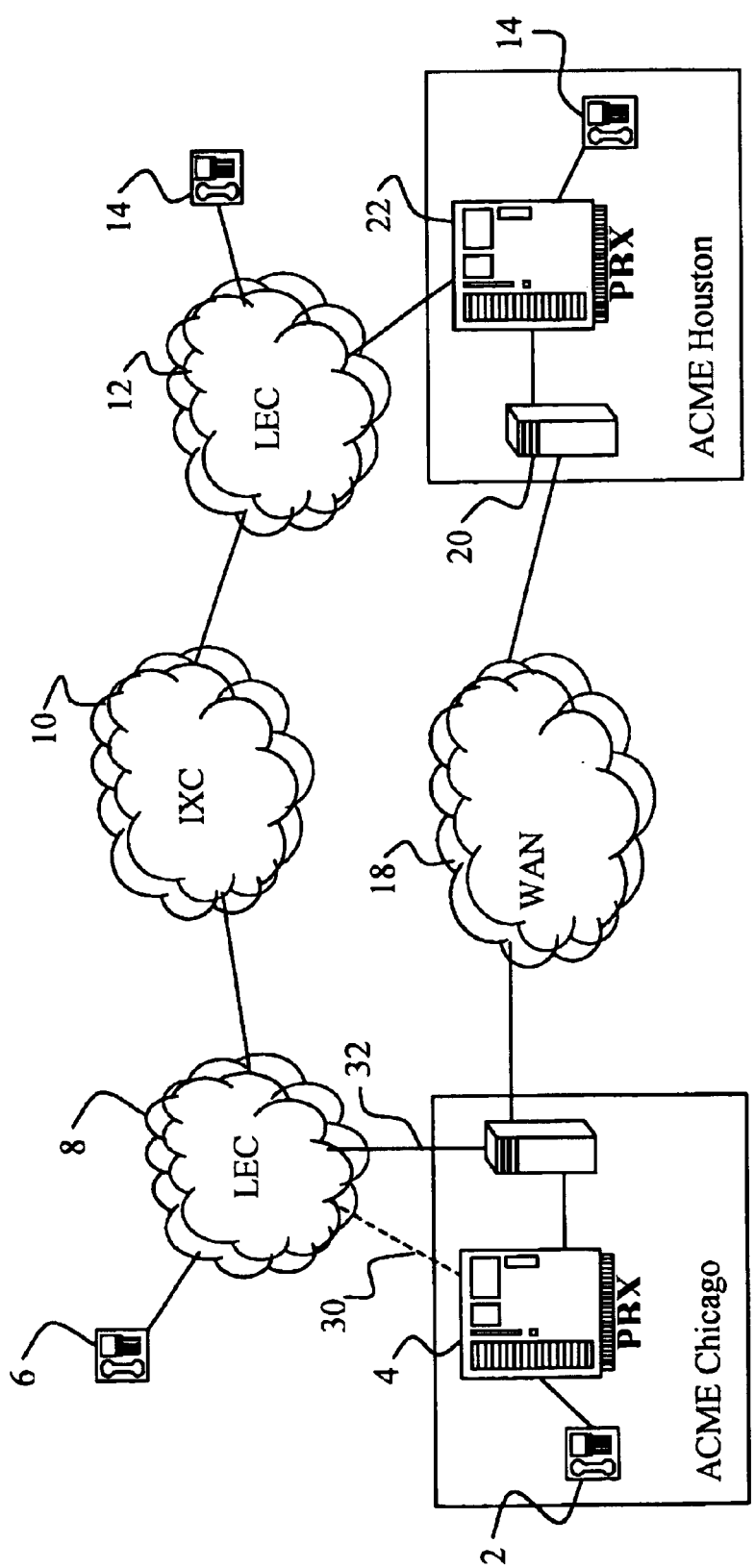
FIG. 2 is a schematic of a voice over packet network configuration as it exists through the method of the invention.

Turning now to the Figures, FIG. 1 is a schematic of a packet based voice system as discussed herein above. FIG. 2 is a schematic of generally the same system as achieved through the method of the invention. In particular, through the method of the invention, PBX 4 has been disconnected from LEC 8 (disconnection illustrated by dashed line 30), and gateway 16 has been connected to LEC 8 with connection 32. Although the schematic of FIG. 1 may at first glance appear similar to that of FIG. 2, it will be readily appreciated by those knowledgeable in the art that operationally achieving the system of FIG. 2 represents a novel and valuable result. In particular, as illustrated in FIG. 2, gateway 16 is required to process all incoming and outgoing call traffic, whether it be over LEC 8 or WAN 18. This provides for significant advantages in configuring a voice over packet format as expenses and efforts associated with interfacing with PBX 4 have been eliminated.

Figure 3:
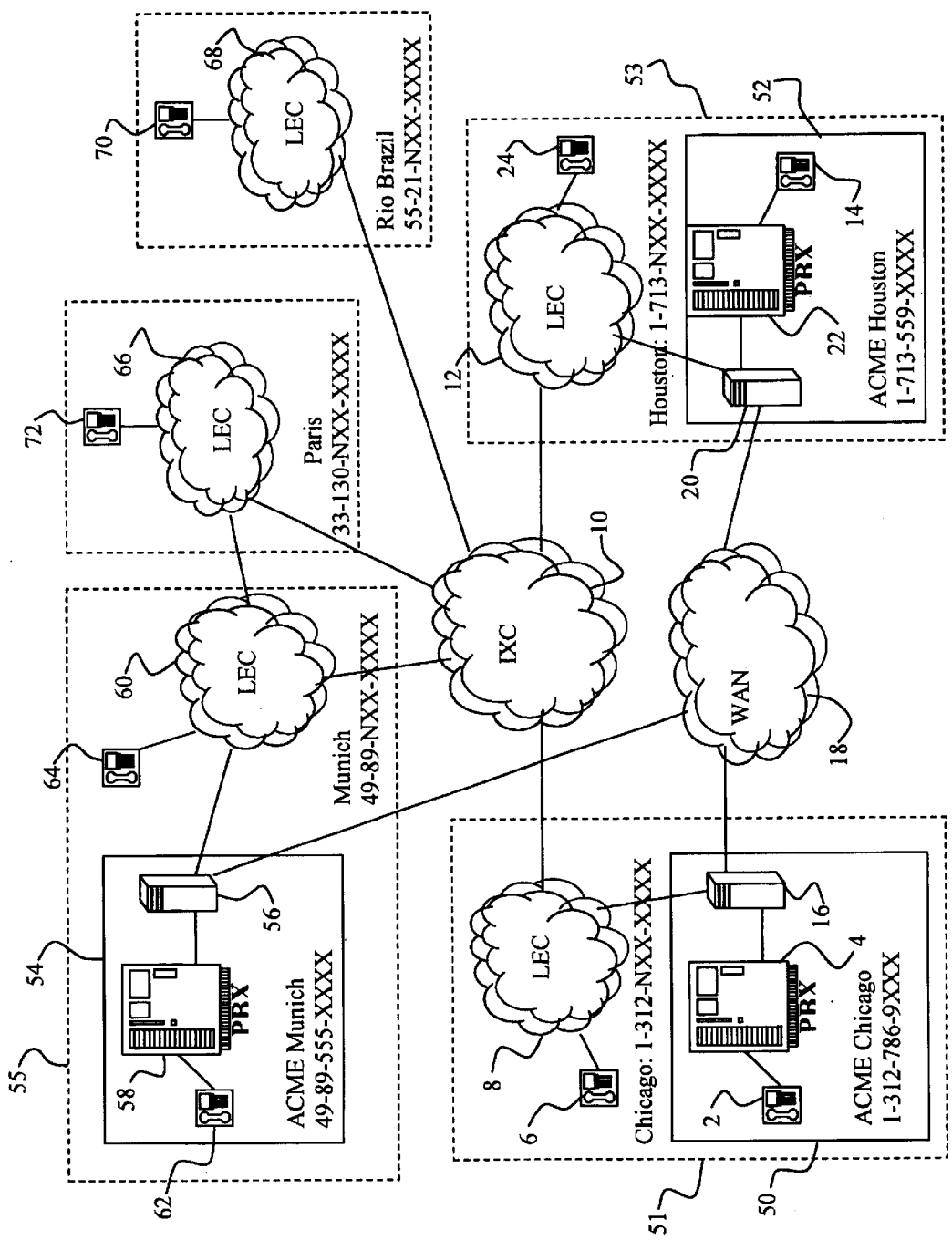
FIG. 3 is a schematic of a voice over packet network configuration.

In further disclosure of the method of the present invention by way of example, reference is made to a hypothetical ACME Corporation having several enterprises dispersed about the globe. It is noted that as used herein, the term "enterprise" is intended to refer to a facility. By way of example and not limitation, an enterprise may comprise a business branch location, a school, a manufacturing plant, or a government office. FIG. 3 is a schematic diagram illustrating a voice over packet system for use with three enterprises, ACME Chicago 50, ACME Houston 52, and ACME Munich 54. Dashed rectangles 51, 53, and 55 represent the Chicago, Houston, and Munich metro regions, respectively. ACME Chicago 50 and ACME Houston 52 are configured generally as described herein above. Chicago gateway 16 is connected to PBX 4, LEC 8, and to WAN 18. Likewise, Houston gateway 20 is connected to WAN 18, PBX 22, and LEC 12. ACME Munich 54 is configured in much the same manner, with gateway 56 connected to PBX 58 and LEC 60.

It is noted that as used herein, "gateway" is intended to refer to a processor-based machine for routing packet-based communications over networks. "Gateways" as used herein are not intended to be limited to single machines, but may well encompass a plurality of machines working together to perform a routing function. As an example, "gateway" as used herein may refer to a gateway router connected to a "gatekeeper" computer and a directory server that all work together to route packet based-communications over a network. Further, the term "router" as used herein refers to a processor-based machine used to receive and transmit data over a data network. These components may exist as separate elements or may be combined into a single processor based component. LEC's 8, 12, 60, 66, and 68 of FIG. 3 are all connected to IXC 10. As used herein, LEC's 8, 12, and 60 are all intended to represent local exchange carriers providing local telephone service within their respective local regions. IXC 10 is intended to represent an inter-exchange, international long distance, and/or national long distance carrier providing connectivity between LECs. It will therefore be appreciated that IXC 10 may be representative of a plurality of different carriers. As used herein all of LEC's 8, 12, 60, and IXC 10 are what are known as public switched telephone networks ("PSTN"). Therefore, as used herein, LEC's 8, 12, 60, 66 and IXC 10 are intended to be species of a PSTN genus, and as used herein the term PSTN is intended to refer to any of a local exchange carrier, long distance carrier, or inter-exchange carrier.

It is also noted that the term "PBX" as used in the art is an acronym for private branch exchange, which is generally an exchange system used to connect phones located at an enterprise. As used herein, "PBX" is intended to broadly encompass traditional PBX systems as known in the art, as well as encompassing any other system that may be used to connect phones located at an enterprise.

As will be appreciated by those knowledgeable in the art, the packet based voice system of FIG. 3 is configured so that ACME Houston 52, ACME Chicago 50, and ACME Munich 54 phones can communicate via a packet basis over WAN 18 and thereby avoid toll charges associated with transmission over the PSTN (LEC's 8, 12, and 60 and IXC 10, collectively). In particular, Houston ACME phone 14 and Houston local phone 24, Chicago ACME phone 2 and local phone 6, and Munich ACME phone 62 and local phone 64, may all be interconnected over WAN 18. In addition, calls to Paris phone 72 and Rio Brazil phone 70 may be leaked from WAN 18 to substantially reduce tolls.

Practice of an embodiment of the method of the invention will allow the packet based voice system of FIG. 3 to allow for the ACME corporation to achieve re-direct functionality that was heretofore not possible. In particular, through the method of the invention gateways 16, 20, and 56 have been programmed to handle all incoming and outgoing call traffic, and to provide re-direct routing for calls originally intended for WAN 18 but that cannot be completed via that route.

This has been accomplished by disconnecting the PBX at each respective enterprise from the respective LEC. "Disconnection" as used herein is not intended to be limited to any particular physical action, but also encompasses a process of ending PSTN service. Respective gateways are then connected to the LEC's, as well as to WAN 18. All call traffic, including re-direct, will now flow through the respective gateways.

As discussed herein above, the method of the invention thereby resolves a number of longstanding problems in the art. In particular, the expense and effort associated with installing and configuring a packet based voice system that comprises call re-direct functionality has been greatly reduced as no replacement, upgrade, or configuration of legacy PBX's is required.

In the practice of the method of the invention the respective gateways are programmed to execute a novel dial plan. In general, this novel dial plan provides logic for routing all calls that flow through the gateway. The dial plan is transparent to the user, meaning that no special dialing instructions are required. As discussed herein, this is most advantageous, as special dialing instructions tend to result in decreased use by end users.

After receiving a call, the dial plan generally must first query a call for a "termination number", which is the phone number of the destination phone the call is intended for. It is noted that as used herein the term "receiving a call" is not intended to be limited to decoding/coding functions, but is instead intended to be interpreted in its broadest sense and is intended to refer to a general step of obtaining call information. After obtaining the termination number, the dial plan logic comprises instruction for using the termination number to identify what "type" of call a particular call is, where it should be routed to, and how to parse the termination number of the call if required. Referring once again to the ACME example and to the schematic of FIG. 3, the dial plan of one embodiment of the method of the invention can be illustrated for gateway 16 for ACME Chicago.

As a preliminary comment, it is noted that American phone numbers herein are assumed to be in a ten-digit NPA-NXX-XXXX format corresponding to the North American Numbering Plan. The NPA portion corresponds to an area code; the NXX, NXX-X, or NXX-XX to a "switch code", and the final XXXX, XXX, or XX to an "extension code". Further, for convenience, reference herein to foreign numbers may be in the same format. As will be appreciated by those knowledgeable in the art, this may not be completely accurate, as foreign numbers may use differing number of digits for their various portions than do American numbers. Generally, however, foreign numbers will have an initial two or three digit "NPA" portion which may correspond to a region code, an area code or a city code; a succeeding two or three digit NXX portion referred to herein as a "switch" code that may correspond to a "sub-region", and a final XXX portion of varying length referred to herein as an "extension".

When dialing for international termination, a phone number will be preceded by a two, three, or four digit international direct dial ("IDD") access code and a one, two, or three digit country code ("CC"). Many countries have adopted a 00 IDD code. The US, however, uses 011. By way of example, when dialing Germany from the U.S., 011 is dialed for international direct dial access, then 49 for Germany, then the German phone number. When dialing for the United Sates from Germany, 00 is dialed for international direct dial access, followed by the US country code of 1, followed by the US phone number. Herein, reference may be made to a country's one, two, or three digit international direct dial access code and country code by reference to the acronyms IDD and CC, respectively, regardless of the number of actual digits.

With reference to FIG. 3, it is noted that Munich has a CC of 49 and a city code of 89. ACME Munich further has a "switch code" of 555. Houston has a CC of 1 and an NPA of 713. ACME Houston has a switch code of 559. Chicago has a CC of 1, and an NPA of 312, and a switch code of 786-9 for ACME Chicago. Paris has a CC of 33, an NPA of 130. Rio de Janeiro, Brazil has a country code of 55, and a city code of 21.

In a preferred embodiment of the method and dial plan of the invention, the dial plan will provide for inbound international leaking. That is, a call may be generated in a first country to be terminated in a second country, but leaked over a data network to a third country for transmission to the second country over the PSTN. This is advantageous if the third country enjoys more competitive international rates than the first country. An example illustrating this can be drawn with reference to FIG. 3. If ACME Germany wishes to place a call to phone 70 in Rio de Janeiro, instead of routing the call over LEC 60, IXC 10, and LEC 68, the call may be leaked over WAN 18 to ACME Chicago gateway 16 for routing over IXC 10 and LEC 68 to phone 70. This could provide savings if for instance Germany had international rates to Brazil over IXC 10 of $1 per minute, while in the US rates of $0.30 per minute were available.

Table 1 summarizes possible call types with example numbers as conceived under an embodiment of the present method and dial plan of the invention. Table 1 has been prepared in the perspective of ACME Chicago gateway 16 of FIG. 3. That is, example termination numbers are as they would be received and processed by gateway 16. Referring to Table 1 as well as FIG. 3, call types A–D are all incoming international calls coming over the WAN 18. Because the calls come over the WAN, the entire dial string is received as the termination number. These calls all originate with 001 prefix, as that is the German IDD dialed at ACME Munich 54. The 001 IDD prefix is followed by a country code of 1 for the United States.

TABLE 1

Possible Call Types

| Call Type | Example Termination Number: | From: | Send to: | Description: | Stripping? |
|---|---|---|---|---|---|
| A | 001-312-786-9XXX | WAN | PBX | WAN to Enterprise (International in) | YES - send XXXX |
| B | 001-1-312-NXX-XXXX | WAN | PSTN | WAN to Local LEAK (International in to be Leaked Local) | YES - send NXX.XXXX |
| C | 001-1-217-NXX-XXXX | WAN | PSTN | WAN to NLD LEAK (International in to be Leaked NLD) | YES - send NPA-NXX-XXXX |
| D | 001-55-21-NXX-XXXX | WAN | PSTN | WAN to International Leak (International in to be Leaked International to Brazil) | YES - strip 00, pre-pend with 011 |
| E | 011-49-89-555-XXXX | PBX | WAN | PBX to WAN International Enterprise | NO (will be stripped by gateway 56 in Munich) |
| F | 011-49-89-NXX-XXXX | PBX | WAN | PBX to WAN International national (in-country) LEAK | NO (will be stripped by gateway 56 in Munich) |
| G | 011-33-130-NXX-XXXX | PBX | WAN | PBX to WAN International for International (out-of-country) LEAK (leaking through ACME Munich to Paris) | NO (will be stripped by gateway 56 in Munich) |
| H | 011-CC-NPA-NXX-XXXX | PBX | PSTN | PBX to PSTN International (if CC does not match Int. Leak List, International Enterprise List) | NO |
| I | 1-312-786-9XXX | WAN | PBX | WAN to Enterprise | YES - send XXXX |
| J | 1-312-NXX-XXXX | WAN | PSTN | WAN to Local Leak | YES - send NXXXXXX |
| K | 1-NPA-NXX-XXXX | PBX | PSTN | PBX to PSTN NLD (NPA not 713) | NO |
| L | 1-713-559-XXXX | PBX | WAN | PBX to WAN National Enterprise (713.NXX.X matches National Enterprise List) | NO (will be stripped by gateway 20 in Houston) |
| M | 1-713-NXX-XXXX | PBX | WAN | PBX to WAN National Leak (713.NXX. matches National Leak List) | NO (will be stripped by gateway 20 in Houston) |
| N | NXX-XXXX | PBX | PSTN | PBX to Local PSTN | NO |

TABLE 1-continued

Possible Call Types

| Call Type | Example Termination Number: | From: | Send to: | Description: | Stripping? |
|---|---|---|---|---|---|
| O | XXX | PSTN | PBX | PSTN to Enterprise | NO |
| P | XXX | PBX | PSTN | Special (911, 411, *69, etc) | NO |

Call type A is an inbound call from phone from ACME Munich phone 62 bound for phone 2. Call type B is inbound from phone 62 for local leaking to Chicago metro phone 6 (note that NXX-X does not equal 786-9). Call type C is inbound from phone 62 for national long distance leaking to a destination phone reachable over LEC 8 and IXC 10. Call type C is completed by leaking over WAN 18 with only national long distance charges from ACME Chicago to the destination phone, providing a savings as compared to paying international rates that would apply had the call been carried by an international carrier between phone 62 and the destination phone. Call type D is received over the WAN for leaking over the PSTN via Chicago (LEC 8, IXC 10, LEC 68) to Brazil, as discussed above.

Call types E–H are all outbound international calls from Chicago phone 2. Call type E is an outbound call destined for phone 62 at ACME Munich for routing over WAN 18, and call type F is an outbound call destined for phone 64 in Munich for routing over WAN 18. Call type G is an outbound call for routing over the WAN to Munich gateway 56 where it will be leaked to the PSTN (LEC 60 to LEC 66) for termination at phone 72 in Paris. Call type G is thus the outbound counterpart to inbound call type D. Call type H is an outbound call bound for a phone in any foreign country other than Germany or France that will thus not be leaked and will instead be sent over the PSTN.

Call types I–M are various inbound and outbound domestic long distance calls. Call type I is an inbound call from ACME Houston phone 14 to ACME Chicago phone 2. Call type J is an inbound call from ACME Houston phone 14 for leaking over LEC 8 to Chicago phone 6. Leaking is of course not limited to "Local" leaking where the termination number NPA matches the enterprise NPA. Other embodiments of the method and dial plan of the invention may comprise more far reaching leaking to NPA's different than the enterprise NPA; both in and out of the enterprise's LATA. As an example, it is noted that call type C comprises an internationally originated call for long distance leaking.

Call type K is an outbound national long distance call from phone 2 for routing over LEC 8 and IXC 10 to a domestic phone located somewhere in the U.S. (but not in Houston). Call type L is an outbound call from phone 2 for routing over WAN 18 and termination at ACME Houston-phone 14. Call type M is an outbound call from phone 2 for routing over WAN 18 for leaking over Houston LEC 12 and termination at phone 24.

Call types N–P are various local inbound and outbound calls. Call type N is an outbound local call from phone 2 for routing over LEC 8 and termination at phone 6. Call type O is an inbound call from LEC 8 for termination at phone 2. It is noted that call type O comprises only three digits; this is because the LEC generally delivers the least number of digits required to terminate the call. That is, assuming that ACME Chicago uses three digit extensions, LEC 8 will not deliver the initial NPA-NXX-X portion of an incoming long distance call; but will only need to deliver the final three digit XXX string required to determine which exact phone the call will terminate at. The number of digits delivered will of course vary with the particular end user, and may by way of example comprise a four digit, a three digit, or a two digit string. This will be the case regardless of whether the call is a local, national long distance, or international long distance call. Call type P is a "special" three digit outbound local call for routing over LEC 8, and may comprise by way of example a 9-1-1 call, a 4-1-1 call, or a *-6-9 call.

The types of calls listed in Table 1 are of course not representative of all possible call types, but are instead a list of possible call types for one embodiment of the dial plan of the invention. Additional call types will be anticipated under other embodiments of the invention. As an example of additional call types, it is within the scope of the appended claims to add an additional layer of leaking whereby phone 6 may dial into gateway 16 over LEC 8 with a call to be delivered over WAN 18 to phone 62 in Munich. Such a call may require two-stage dialing, which could be accommodated by a dial plan within the scope of the appended claims.

The dial plan of the invention provides logic to determine how to categorize a call according to the call types of Table 1. This task is difficult in that most commercial gateways are not provided with means for determining a call source. That is, calls are not identified with a source. The gateway has no way of knowing that a given call came in from the PSTN other than through dial plan logical analysis of the termination number.

Initial steps of an embodiment of the dial plan of the invention comprise preparing several lists that will be useful to differentiate the call types from one another. These lists are summarized in Table 2, and generally comprise a National Enterprise list, a National Leak list, an International Inbound list, an International Outbound Enterprise list, an International Outbound Leak list, and a Special list. The National Enterprise list contains NPA-NXX numbers corresponding to all domestic enterprises, and will be used to identify calls that correspond to type L from Table 1. If a call has a termination number that appears on this list, it means that the call is bound for a domestic enterprise and should be routed over the WAN. The National Leak list contains NPA numbers corresponding to domestic regions to leak to, and will be used to identify calls of type M from Table 1. The example numbers portion of Table 2 has been prepared from the perspective of Chicago gateway 16 of FIG. 3. As will be appreciated by those knowledgeable in the art, each of the respective lists must be prepared for each of the gateways in a packet based voice system. For the example of FIG. 3, then, a National Enterprise, a National Leak, an International Inbound, and International Outbound Enterprise, an International Outbound Leak, and a Special list would be prepared for each of gateways 16, 56, and 20.

TABLE 2

| List: | Description: | Example Number (for ACME example of FIG. 3) | Call Type (from (Table 1) |
|---|---|---|---|
| National Enterprise | List of NPA-NXX numbers corresponding to domestic enterprises | 713-559 | L |
| National Leak | List of NPA numbers corresponding to domestic regions to leak to | 713 | M |
| International Inbound | List of Foreign Access codes from countries in which WAN international call could originate | 00 | A, B, C, D |
| International Outbound Enterprise | List of CC-NPA-NXX numbers corresponding to international enterprises | 49-89-555 | E |
| International Outbound Leak | List of CC numbers corresponding to international regions to leak to over WAN | 49, 33 | F, G |
| Special | List of "special" numbers of less than seven digits corresponding to outbound PSTN calls | 911, 411, *69 | P |

Table 2's International Inbound list contains a list of foreign international long distance access (IDD) codes from countries in which a call coming over the WAN may have originated, and will be used to identify calls of types A-D from Table 1. The International Outbound Enterprise list comprises CC-NPA-NXX numbers corresponding to International Enterprises as will be used to identify call type E from Table 1. As noted above, herein the NXX string is referred to as a "switch code", and will be of differing lengths for different enterprises and different countries. By way of example, the switch code for ACME Chicago 50 in FIG. 3 is 786-9, and for ACME Houston 52 is 559. The switch code may comprise as few as two digits, and as many as five.

The International Outbound Leak list comprises a list of numbers corresponding to international regions to which calls will be leaked over the WAN. This list is used to identify calls of type F and G from Table 1. The Special list comprises a list of numbers of less than seven digits corresponding to special services such as directory assistance and emergency numbers. The Special list will be used to identify call type P from Table 1. More detail regarding the use of these lists will be provided in the following discussion of the dial plan logic.

Developing the International Outbound Leak list will be guided to an extent by least cost routing considerations. In particular, call type G from Table 1 will require a comparison of rates for routing directly over the PSTN or routing over the WAN. It is anticipated that the US will enjoy much more competitive international rates than many other parts of the world, and that call type D (the inbound sister type to outbound type G) will be frequently used.

FIGS. 4–7 comprise a flow chart illustrating the logic of an embodiment of the dial plan of the invention for use by Chicago gateway 16 of FIG. 3. That is, the flow chart illustrates an embodiment of the dial plan of the invention that would be used by Chicago gateway 16 to categorize and determine routing instructions for calls. Because it is in the perspective of Chicago gateway 16, the flow chart corresponds generally to call types of Table 1. As will be appreciated by those knowledgeable in the art, each gateway 16, 20, and 56 of FIG. 3 would be required to be programmed with a dial plan for the ACME packet based phone system to operate.

Figure 4:
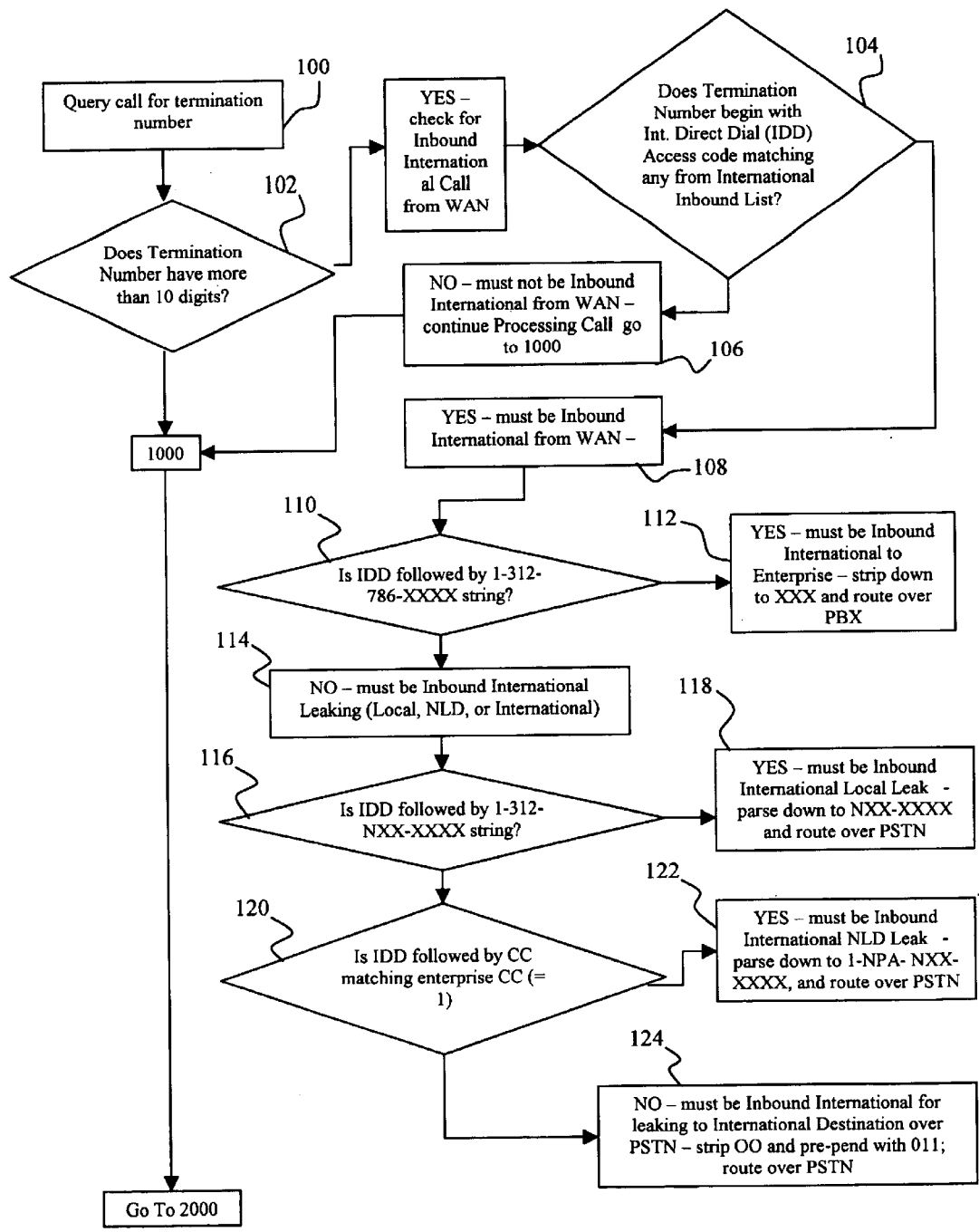
FIGS. 4–7 are a flow chart illustrating an embodiment of the method and dial plan of the present invention.

At node 100 of FIG. 4, an incoming call is queried for a termination number. At node 102 the termination number is inspected to determine if it has more than 10 digits. If it contains more than ten digits, it must be one of call types A–H from Table 1. Node 104 describes an examination of the termination number to determine if it begins with a string that matches any from the International Inbound list. This will determine whether the call can be categorized as a type A–D inbound international call from the WAN. That is, if a call termination number begins with a foreign access code from a country in which a WAN call could have originated, it must have been routed from that country over the WAN to the destination gateway. As an example, if Chicago gateway 16 of FIG. 3 receives a call with a termination number of greater than ten digits, it must be an international call (either incoming or outgoing). If the termination number begins with 00, it must have originated in Germany (since a US international call would begin with 011).

Because the ACME packet based voice system schematically illustrated in FIG. 3 describes enterprises as in only two countries, the International Enterprise list programmed into Chicago gateway 16 will contain only one foreign IDD. Likewise, an International Inbound list for gateway 56 in Germany would contain only one IDD code: 011. If there were enterprises in additional countries, the International Inbound list would of course comprise additional IDD's.

Referring once again to FIG. 4, node 106 returns to further dial plan inquiries on a negative response to node 104, while node 108 continues along a logically narrowing path upon a positive response to node 104. Node 110 examines the termination number to determine whether it contains a string after the 00 IDD corresponding to the ACME Chicago enterprise NPA-NXX-X code (312-786-9XXX). If so, it is concluded at 112 that the call must be an inbound international call from an international enterprise for termination at FIG. 3's phone 2 (type A from Table 1). The termination number is stripped down to an XXX extension string that PBX 4 will find useful, and is routed to PBX 4 for termination. It is noted that herein the terms "strip", "parse" and "truncate" are all intended to be generally interchangeable, and refer to a process of removing a portion of a dialed digit string.

With reference again to the flow chart of FIG. 4, if the termination number does not contain the NPA-NXX-X string corresponding to the ACME Chicago enterprise, then it is determined at 114 that the call must be an international inbound call from the WAN for local, national, or international leaking (type B, C or D, respectively, from Table 1). At 116 the termination number is examined to determine if it contains an NPA code corresponding to the local Chicago code. If it does, it is a type B local leak call from Table 1. The termination number is parsed down to an NXX-XXXX format and routed to FIG. 3's LEC 8 for termination at node 118 of FIG. 4.

Node 120 describes actions taken on a negative response to the inquiry of node 116: the call is determined to be an inbound international call for national long distance leaking over the PSTN, corresponding to Type C from Table 1. In this case the termination number must be parsed down to an NPA-NXX-XXXX format, pre-pended with a 1 (for national long distance access), and routed over the PSTN for termination at a phone located in a different area code than the 312 code of FIG. 3's gateway 16.

Upon a negative response to node 120, it is concluded that the call must be of type D from Table 1. That is, the call must be an inbound WAN leaking call for routing over the PSTN to an international location as described in node 124. Referring to Table 1 and FIG. 3 by way of example, an incoming WAN call having a termination number of 00-55-21-NXX-XXXX would first be determined to be:

an international call at node 102,
an incoming WAN international call at 104,
not to be an incoming enterprise call at 110,
not to be an incoming local leak call at 116,
to be an incoming international leak call at 120.

Figure 5:
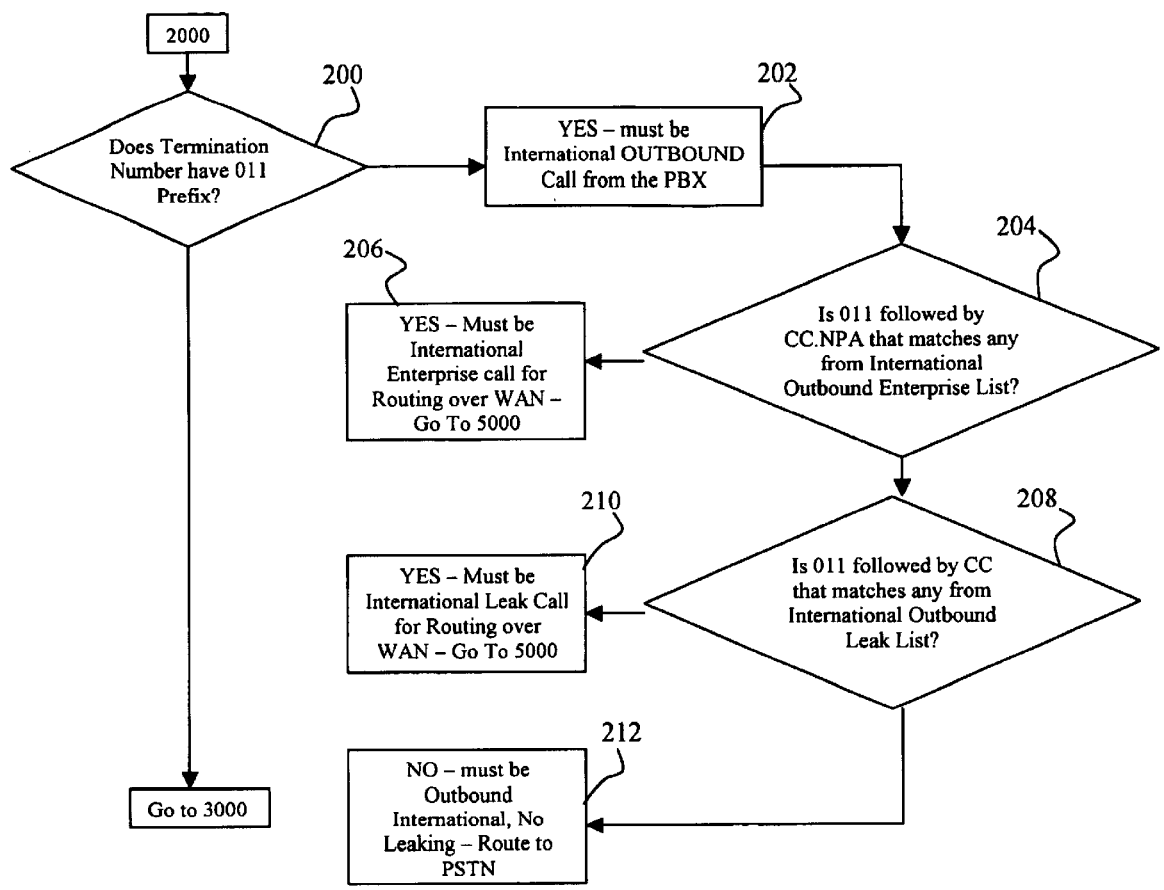

FIG. 5 continues the logic of the embodiment of the dial plan of the invention from FIG. 4. Node 200examines the call termination number to determine if it has a 011 prefix. If it does, the call must be of type E–H from Table 1, as indicated by node 202. With reference again to FIG. 3, the call must be an international outbound call from PBX 4 of FIG. 3. Next it must be determined whether the call should be routed over the PSTN or the WAN. Node 204 examines the termination number to determine if the 011 prefix is followed by a CC.NPA that matches any of the CC.NPA from the International Enterprise list. If so, the call is categorized as a type E from Table 1 and is to be routed over the WAN to an international enterprise destination. As an example, if gateway 16 of FIG. 3 determined the termination number to begin with the string 011-49-89-555, the call would be determined to be an International Enterprise type E for routing over WAN 18 for termination at phone 62 at ACME Munich. At node 206 the dial plan would then be routed to node 5000.

If node 204 is answered in the negative, the dial plan continues to node 208, where the termination number is examined to determine if the 011 prefix is followed by a CC that matches any from the International Leak list. If so, the call must type F or G from Table 1 and be for routing over the WAN for international leaking, as indicated by node 210. For example, gateway 16 of FIG. 3 would determine a call with termination number beginning with a string of 011-49-89-421 should be routed over WAN 18 to ACME Munich gateway 56 for leaking to Munich LEC 60. Also, if the call began with a 011-33 string, it would be identified as a type G call to be routed from Munich to Paris phone 72.

It is noted that further differentiation could be made between call types F and G. For example, the International Outbound Leak list could be sub-divided into local leaking, in-country leaking, and international leaking. A local leaking list could be developed using desired CC-NPA strings, an in-country leaking list developed with CC strings, and an international leaking list developed with CC strings.

Referring again to FIG. 5, if the call has a termination number that does not categorize it as an International Enterprise (type E from Table 1) or an International Leak call (type F or G from Table 1), then the call is determined to be an international call for transmission over the PSTN at node 212 (type H from Table 1). Simply put, if the call is an outbound international call and it is not to be routed over the WAN for leaking or destination at an enterprise, it must be for routing over the PSTN to some country not on any leaking or enterprise list.

Figure 6:
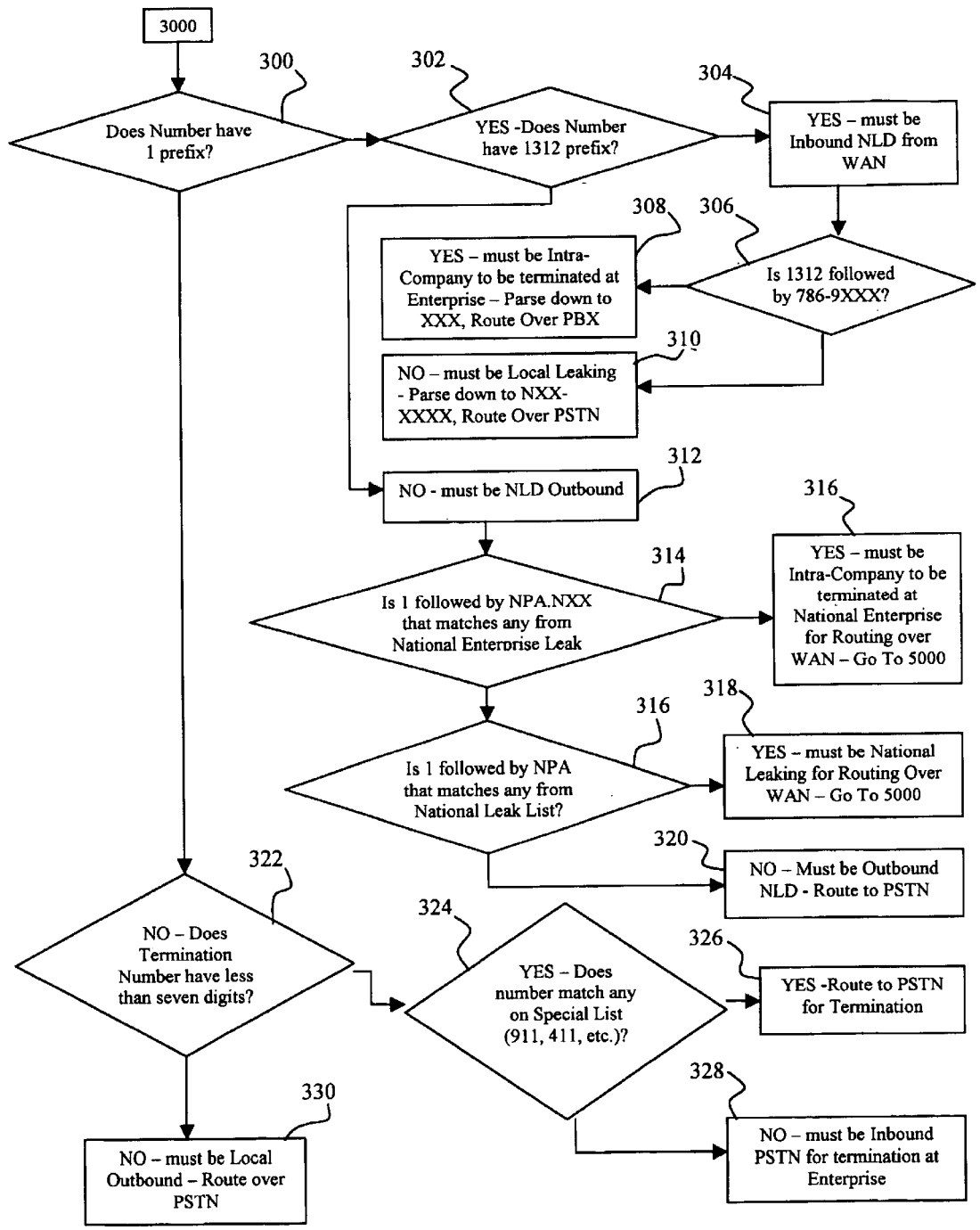

The embodiment of the dial plan of the invention continues in FIG. 6. At node 3000, the termination number is examined to determine if it begins with a 1. If so, the call must be one of Types I–M from Table 1. At node 302 of FIG. 6, the termination number is examined to determine if a 1-312 prefix exists. If so, the call must be inbound from the WAN as commented at node 304, and categorized as call type I or J from Table 1. Node 306 then checks the termination number for a switch code that matches the ACME Chicago facility to differentiate between call types I and J. If this exists the call must be a type I destined for termination at phone 2 of FIG. 3 as indicated by node 308. If the switch code does not match the ACME Chicago facility, the call must be a type J for leaking over LEC 8 of FIG. 3 to local phone 6, as indicated by a negative response to node 306 in node 310.

A negative response to node 302 leads the dial plan to node 312, and generally indicates that the call is of type K–M of Table 1. At node 314 the termination number is checked to see if the 1 prefix is followed by an NPA-NXX that matches any from the National Enterprise list from Table 2. If so, the dial plan concludes at node 316 that the call is a type L call from Table 1 to be terminated at another national enterprise. Referencing the ACME example of FIG. 3, the Chicago gateway 16 would conclude that the call was to be routed over WAN 18 to ACME Houston phone 14.

A negative response to node 314 leads the dial plan to node 316, which checks the termination number to see if the call is of type M from table 1 and is to be leaked over the WAN. If so, the termination number will have an NPA string that matches one from the National Leak list of Table 2, and the dial plan will proceed to node 318 of FIG. 6. If not, the dial plan concludes at node 320 that the call is an outbound national long distance call (type K from table 1) and is for routing to the PSTN.

It is noted that the example National Leak list described in Table 2 contains only one NPA code, which is the same as the ACME Houston enterprise 52 NPA. As will be appreciated by those knowledgeable in the art, however, the National Leak list may comprise additional NPA codes that are not identical to an enterprise's. As an example, other NPA codes within the enterprise LATA may well be included on the leak list. NPA's of 832 and 281 are within the same LATA as Houston NPA 713, and thereby would be good candidates to be included on the National Leak List.

Other NPA codes not within the same LATA may also be included. For instance, it could be the case that calls could be completed from Houston to Denver at a lower rate than calls from Chicago to Denver. In such a case, the National Leak list could include an NPA code of 213 (corresponding to Denver), so that calls from ACME Chicago with a 213 NPA code would be routed over the WAN to ACME Houston for leaking to the PSTN to Denver. The National Leak list may therefore comprise a plurality or even a multiplicity of NPA codes.

If the termination number does not begin with a 1, the dial plan proceeds from node 300 to node 322, where it checks to see if the termination number has less than seven digits. Recall that incoming calls delivered from the PSTN to the enterprise are delivered with the termination number set at the fewest digits required to terminate the call. That means that the call will be delivered with fewer than seven digits. Thus calls with fewer than seven digits must be inbound from the PSTN, or some "special" outbound call dialed with less than seven digits.

If the call termination number has less than seven digits, the dial plan proceeds to node 324 to determine whether termination number matches any numbers from the Special list of table 2. If the number matches a special number, the dial plan concludes at 326 that the call is an outbound call to be routed to the PSTN corresponding to type P from Table 1. If the termination number does not match a special number, the dial plan proceeds to node 328, where the call is routed to the PBX for termination at the enterprise. These calls correspond to type O from Table 1. Upon a negative response to node 322 (i.e. termination number has 7 digits), the dial plan proceeds to node 330, where it concludes that the call is an outbound local call for routing to the PSTN, indicating a type L call from Table 1.

Figure 7:
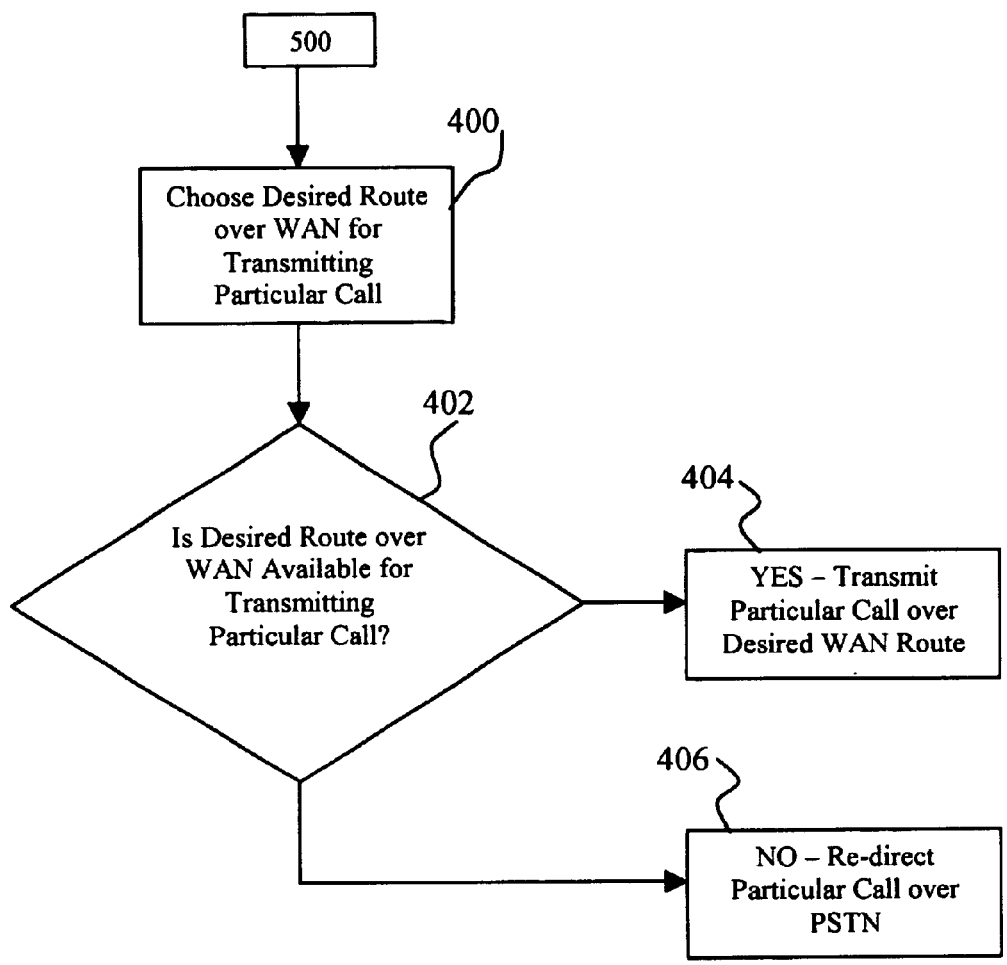

FIG. 7 presents the re-direct portion logic of the dial plan embodiment of FIGS. 4–6. Recall that Node 5000 is where the dial plan sends all calls that are to be routed over the WAN. At node 400, the dial plan chooses a route over the WAN for transmitting the call. Methods for choosing the route are generally known in the art. At 402 the dial plan checks the desired route to determine its availability. If the desired route is available for transmission, the call is transmitted over the route at 404. If the route is not available, the dial plan chooses an alternate desired route over the PSTN at 406.

As used herein, the term "checking the availability" is intended to refer to a step of determining whether a desired route is currently available for sending a packet transmission. Various methods for "checking the availability are known in the art. As a first example, gateway systems available from the Cisco Corporation use information packets that are sent from the gateways (routers) reporting status of the calls. Likewise, gateway systems available from the Clarent Corporation use a gatekeeper to monitor the availability of call completion, with the gatekeeper regularly informing the gateways of available routes. As an additional example, it is also known to send a "ping" over a desired route, with the availability of that route indicated by successful receipt of the "rebounded" ping.

Preferably, the dial plan and method of the invention comprise programming a gateway to perform the various steps of the dial plan as detailed above. The term "programming" as used herein is intended to be interpreted in its broadest sense. For example, and not for limitation, "programming" a gateway may comprise giving a gateway instruction directly through entry of commands, may comprise preparing an executable computer code program for use by a gateway, or may comprise loading pre-written software code onto the gateway for execution.

As such, an additional embodiment of the invention comprises a computer readable storage medium, with means recorded on the storage medium for executing the various steps of the dial plan as detailed herein. Preferably, the storage medium comprises a magnetic storage tape or disc, an optically readable disc, or a flash memory device. Preferred means recorded on the storage medium comprise computer readable instructions, as may be written using any of a plurality of computer languages including, but not limited to, C, C+, C++, visual basic, or Cisco IOS. As is appreciated by those knowledgeable in the art, these languages may be used to write instructions that are then "compiled" into a computer readable format.

It will also be appreciated by those knowledgeable in the art that the embodiment of the dial plan and method of the invention that has been herein described is only an example of the practice of the invention as claimed, and that many variations to the embodiment as described can be made while remaining in the scope of the claims. As an example, the dial plan logic as summarized in the flow chart of FIGS. 4–7 could be easily rearranged in sequence while not changing the result of the plan. The various steps of the dial plan and method of the invention are not limited to any particular sequence.

Further, the various steps of the embodiment of the dial plan discussed herein could easily be altered within the scope of the invention. As an example, several steps of the dial plan examine a call termination number string for certain sub-strings contained therein. These could be described or detected in a manner different from that described herein in detail. By way of a particular example, node 120 of FIG. 4 determines if the termination number string has a sub-string of 1-NPA-NXX-XXXX following the IDD. This node could be replaced with a node that simply looks for a CC of 1 following the to IDD. It will therefore be appreciated that the dial plan of the invention is limited only in that certain decisions are to be made about a call based on its termination number, and that the exact logic used to make that decision can vary within the scope of the attached claims.

Also, the dial plan as described herein makes use of a number of "lists" as detailed in Table 2. These lists are simply groupings of data, and may comprise databases, data files, or other known data depositories. Further, the lists have been shown as individual and distinct lists. They could of course likewise be combined into a single or other combined grouping.

The advantages of the disclosed invention are thus attained in an economical, practical, and facile manner. While preferred embodiments and example configurations have been shown and described, it is to be understood that various further modifications and additional configurations will be apparent to those skilled in the art. It is intended that the specific embodiments and configurations herein disclosed are illustrative of the preferred and best modes for practicing the invention, and should not be interpreted as limitations on the scope of the invention as defined by the appended claims. As an example, it will be obvious to those knowledgeable in the art that the specific order or number of method steps as disclosed herein could be altered somewhat without change to the underlying spirit and scope of the invention.

What is claimed is:

1. A method for providing call redirect functionality for a packet based voice system having at least a gateway connected to a PBX and to a data network, the PBX connected to a PSTN, the method comprising the steps of:

a) disconnecting the PBX from the PSTN;

b) connecting the gateway to the PSTN;

c) programming the gateway to receive and determine a desired route for transmission of all incoming and outgoing calls, said incoming and outgoing calls including but not limited to all incoming calls from the PSTN, all incoming calls from the data network, and all outgoing calls from the PBX, said step of programming comprising the steps of programming the gateway to execute a dial plan comprising steps of:

i) receiving a call and querying said call for a termination number;

ii) determining a desired route for said call by:

(1) using said termination number to determine if said call should be routed to the PSTN, PBX, or data network; and d) programming the gateway to transmit said incoming and outgoing calls over said desired route if said desired route is over the PSTN or over the PBX; and e) programming the gateway to detect if said desired route is available for transmitting said incoming and outgoing call if said desired route is over the data network, programming the gateway to transmit said call over said desired route over the data network if said desired route is available and to transmit said call over the PSTN if said desired route is not available.

2. A method for providing redirect functionality to a packet based voice system as in claim 1, wherein the method further comprises the step of receiving a call and querying said call for a termination number, and wherein said steps of programming the gateway to transmit said call over said desired route further comprise truncating said termination number for transmission over said desired route if said call is received over the data network and is for routing over the PSTN.

3. A method for providing redirect functionality for a packet based voice system as in claim 1, wherein said dial plan further comprises the steps of:
   a) using said termination number to determine if said call is:
      i) an intra-company inbound call coming over the data network wherein a desired route is determined to be over the PBX;
      ii) an inbound leaking call coming over the data network wherein a desired route is determined to be over the PSTN;
      iii) an outbound leaking call coming from the PBX wherein a desired route is determined to be over the data network; or
      iv) an outbound call coming from the PBX wherein a desired route is determined to be over the PSTN.

4. A method for providing a redirect functionality for a packet based voice system as in claim 1, wherein the enterprise has a country code, a three digit area code, and an at least a three digit switch code; wherein said termination number comprises a string of numerical digits, and wherein said dial plan further comprises the steps of:
   a) developing a national enterprise list, said national enterprise list comprising at least an enterprise number with a three digit area code and an at least three digit switch code; and
   b) categorizing said call as an:
      i) inbound national long distance call from the data network wherein a desired route is over the PBX if said termination number begins with a one and is followed by three digits that match the enterprise three digit area code followed by at least three digits that match the enterprise at least three digit switch code;
      ii) outbound national long distance enterprise call from the PBX wherein a desired route is over the data network if said termination number begins with a one and is followed by a three digit area code and an at least three digit switch code that match a three digit area code and an at least three digit switch code from one of said enterprise numbers from said national enterprise list; or
      iii) inbound call from the PSTN wherein a desired route is over the PBX if said termination number has fewer than seven digits.

5. A method for providing redirect functionality for a packet based voice system as in claim 4; wherein said dial plan further comprises the steps of:
   a) developing a national leak list, said national leak list comprising a list of at least a national leak number having an at least a three digit area code; and
   b) the step of categorizing said call further comprising categorizing said call as an:
      i) outbound national leaking call from the PBX wherein a desired route is over the data network if said termination number begins with a one and is followed by three digits that match said at least three digit area code from one of said national leak numbers on said national leak list;
      ii) inbound national leaking call from the data network wherein a desired route is over the PSTN if said termination number begins with a one followed by three digits that match the enterprise area code followed by at least three digits that do not match the enterprise at least three digit switch number; or
      iii) outbound national long distance call from the PBX wherein a desired route is over the PSTN if said termination number begins with a one and is not categorized as a said inbound national leaking call, a said outbound national leaking call, a said inbound national long distance call, or a said outbound national long distance enterprise call.

6. A method for providing redirect functionality for a packet based voice system as in claim 4, wherein the dial plan further comprises the steps of:
   a) developing an international outbound enterprise list, said international outbound enterprise list comprising a list of at least an international outbound enterprise number having a country code, followed by a foreign area code, followed by a foreign switch code;
   b) developing an international inbound list, said international inbound list having at least an inbound international number, said inbound international number comprising an at least two digit international direct dial access code; and
   c) the step of categorizing said call further comprises categorizing said call as an:
      i) outbound international enterprise call wherein a desired route is over the data network if the first three digits of said termination number are 011 and are followed by a country code, a foreign area code, and a foreign switch code that match a country code, a foreign area code, and a foreign switch code from one of said at least an enterprise numbers from said international outbound; enterprise list; or
      ii) international inbound enterprise call from the data network wherein a desired route is over the PBX if said termination number has more than ten digits and an at least two digit prefix that matches said at least two digit international direct dial access code from one of said at least one inbound international number from said international inbound list, and is followed by a country code, a three digit area code, and an at least three digit switch code that match the enterprise country code, three digit area code, and at least three digit switch code from the enterprise.

7. A method for providing redirect functionality for a packet based voice system as in claim 6, wherein said dial plan further comprises the steps of:
   a) developing an international outbound national leak list, said international outbound national leak list comprising a list having at least an international outbound leak number, each of said at least an international outbound leak numbers having a country code, followed by an area code; and
   b) the step of categorizing said call further comprises categorizing said call as an:
      i) outbound international national leak call wherein a desired route is over the data network if said termination number has three first digits of 011 followed by a country code and an area code that match a country code and area code from one of said at least a foreign leak number on said foreign leak list;

ii) outbound international call wherein a desired route is over the PSTN if said termination number has three first digits of 011 and said call is not classified as a said outgoing international enterprise call or a said outgoing international leak call;

iii) inbound international local leaking call from the data network for routing over the PSTN if said terminating number has more than ten digits and said terminating number has an at least two digit prefix that matches said at least two digit international direct dial access code from one of said at least one inbound international number from said international inbound list, followed by a country code and an area code that matches the enterprise country code and area code, followed by an at least three digit switch code that does not match the enterprise at least three digit switch code; or iv) inbound international long distance leaking call from the data network wherein a desired route is over the PSTN if said terminating number has an at least two digit prefix that matches said at least two digit international direct dial access code from one of said at least one inbound international number from said international inbound list, followed by a country code that matches the enterprise country code, followed by a three digit area code that does not match the enterprise three digit area code.

8. A method for providing redirect functionality for a packet based voice system as in claim 7, wherein said dial plan further comprises the steps of categorizing said call as an:

a) inbound international for international leaking call from the data network wherein a desired route is over the PSTN if said terminating number has an at least two digit prefix that matches said at least two digit international direct dial access code from one of said at least one inbound international number from said international inbound list, followed by a country code that does not match the enterprise country code.

9. A method for providing redirect functionality for a packet based voice system as in claim 1, wherein the system is for use by an enterprise having a country code, a three digit area code, and an at least a three digit switch code; wherein said termination number comprises a string of numerical digits; and wherein said dial plan comprises the steps of:

a) developing a special list comprising at least a special number;

b) developing a national enterprise list at least an enterprise number having a three digit area code and an at least three digit switch code;

c) receiving a call and querying said call for a termination number, said termination number comprising a string of numerical digits;

d) categorizing said call as an:

i) inbound national long distance call from the data network wherein a desired route is over the PBX if said termination number begins with a one and is followed by three digits that match the enterprise three digit area code followed by at least three digits that match the enterprise at least three digit switch code;

ii) outbound national long distance enterprise call from the PBX wherein a desired route is over the data network if said termination number begins with a one and is followed by a three digit code and an at least three digit switch code that match a three digit code and an at least three digit switch code from one of said enterprise numbers from said national enterprise list;

iii) outbound local call from the PBX wherein a desired route is over the PSTN if said termination number matches any of said at least a special number on said special list; or iv) inbound call from the PSTN wherein a desired route is over the PBX if said termination number has fewer than seven digits.

10. A method for providing call redirect functionality for a packet based voice system, the system having at least a PBX connected to a gateway and connected to the PSTN, the gateway connected to a data network, comprising the steps of:

a) disconnecting the PBX from the PSTN;

b) connecting the gateway to the PSTN;

c) programming the computer to execute a dial plan; comprising steps of:

i) receiving a call and querying said call for a termination number;

ii) using said termination number to determine if said call is:

(1) an intra-company call from over the data network wherein a desired route is over the PBX;

(2) a leaking call from over the data network wherein a desired route is over the PSTN;

(3) a leaking call from the PBX wherein a desired route is over the data network; or (4) an outgoing call from the PBX wherein a desired route is over the PSTN;

d) programming the gateway to transmit said call over said desired route if said desired route is over the PSTN or over the PBX; and e) programming the gateway to test said desired route if said desired route is over the data network to detect if said desired route is unavailable for transmitting said call, programming the gateway to transmit said call over said desired route if said desired route is available; and programming the gateway to redirect transmission of said call over the PSTN if said desired route is unavailable.

11. A method for providing call redirect functionality for a packet based voice system for an enterprise, the voice network having at least a PBX connected to a gateway and connected to the PSTN, the gateway connected to a data network, the enterprise having a three digit area code and an at least three digit switch code, the method comprising the steps of:

a) disconnecting the PBX from the PSTN;

b) connecting the gateway to the PSTN;

c) developing a national enterprise list having at least an enterprise number having a three digit area code and an at least three digit switch code;

d) developing a national leak list having a list of at least one national leak number comprising an at least a three digit area code; and e) developing an international outbound enterprise list having at least an international outbound enterprise number, said international outbound number having an at least two digit country code, followed by an area code, followed by a switch code;

f) developing an international outbound leak list having at least an international outbound leak number having an at least two digit country code, and an area code;

g) developing an international inbound list having at least an inbound international number, said inbound international number comprising an at least two digit international direct dial access code;

h) developing a special list comprising at least a special number;

i) programming the gateway to execute a dial plan; said dial plan comprising steps of:
   i) receiving a call, querying said call for a termination number; said termination number comprising at least an extension number;
   ii) using said termination number to categorize said call as an:
      (1) inbound national long distance call from the data network wherein a desired route is over the PBX if said termination number begins with a one and is followed by three digits that match the enterprise three digit area code followed by at least three digits that match the enterprise at least three digit switch code;
      (2) outbound national long distance enterprise call from the PBX wherein a desired route is over the data network if said termination number begins with a one and is followed by a three digit area code and an at least three digit switch code that match a three digit area code and an at least three digit switch code from one of said at least an enterprise number from said national enterprise list;
      (3) special call from the PBX wherein a desired route is over the PSTN if said termination number is less than seven digits and matches one of said at least a special number from said special list;
      (4) inbound call from the PSTN wherein a desired route is over the PBX if said termination number has fewer than seven digits and is not categorized as a said special call;
      (5) outbound national leaking call from the PBX wherein a desired route is over the data network if said termination number begins with a one and is followed by three digits that match said at least three digit area code from one of said at least a national leak numbers from said national leak list;
      (6) inbound national leaking call from the data network wherein a desired route is over the PSTN if said termination number begins with a one followed by three digits that match the enterprise area code followed by at least three digits that do not match the enterprise at least three digit switch number;
      (7) outbound national long distance call from the PBX wherein a desired route is over the PSTN if said termination number begins with a one and is not categorized as a said inbound national leaking call, a said outbound national leaking call, a said inbound national long distance call, or a said outbound national long distance enterprise call;
      (8) outbound international enterprise call from the PBX wherein a desired route is over the data network if the first three digits of said termination number are 011 and are followed by an at least two digit country code, an area code, and a switch code that match said at least two digit country code, said area code, and said switch code from one of said enterprise numbers from said international outbound enterprise list;
      (9) outbound international leak call from the PBX wherein a desired route is over the data network if said termination number has three first digits of 011 followed by a country code and an area code that match said country code and said area code from one of said at least a foreign leak numbers on said foreign leak list;
      (10) outbound international call from the PBX wherein a desired route is over the PSTN if said termination number has three first digits of 011 and said call is not classified as a said outgoing international enterprise call or a said outgoing international leak call;
      (11) inbound international call from the data network wherein a desired route is over the PBX if said terminating number has more than ten digits and has an at least two digit prefix that matches said at least two digit international direct dial access code from one of said at least an inbound international number from said international inbound list followed by a country code, a three digit area code, and an at least three digit switch code that match the country code, three digit area code, and at least three digit switch code of the enterprise;
      (12) inbound international local leaking call from the data network wherein a desired route is over the PSTN if said terminating number has more than ten digits beginning with an at least two digit prefix that matches said at least two digit international direct dial access code from one of said at least one inbound international number from said international inbound list, followed by a country code and an area code that match the enterprise country code and area code, and said terminating number having an at least three digit switch code following the three digit area code that does not match the enterprise at least three digit switch code; or
      (13) incoming international long distance leaking call from the data network wherein a desired route is over the PSTN if said terminating number has more than ten digits beginning with an at least two digit prefix that matches said at least two digit international direct dial access code from one of said at least an inbound international numbers from said inbound international list, followed by a country code that matches the enterprise country code, followed by a three digit area code that does not match the enterprise area code;

j) programming the gateway to truncate said termination number to:
   i) said extension number if said call is categorized as a said inbound national long distance call or a said inbound international call;
   ii) an at least three digit switch code and said at least an extension code if said call is categorized as a said inbound national leaking call or a said international inbound local leaking call;
   iii) said at least three digit area code, said at least three digit switch code, and said extension number if said call is categorized as a said inbound international long distance leaking call;

k) programming the gateway to transmit said call over said desired route if said desired route is over the PSTN or over the PBX; and l) programming the gateway to test said desired route if said desired route is over the data network to detect if said desired route is unavailable for transmitting said call, programming the gateway to transmit said call over said desired route if said desired route is available; and programming the gateway to redirect transmission of said call over the PSTN if said desired route is unavailable.

12. A dial plan for use with a gateway in a packet based voice system, the gateway connected to a PBX serving an enterprise, to a data network, and to a PSTN; the enterprise having a country code, a three digit area code, and an at least a three digit switch code; the dial plan having a national enterprise list comprising at least an enterprise number, each of said at least an enterprise number having a three digit area code and an at least three digit switch code; and wherein the dial plan comprising the steps of:

a) programming the gateway to perform the steps of:
  i) receiving a call and querying said call for a termination number;
  ii) using said termination number to determine if said call should be routed over the PSTN, PBX, or data network;
  iii) programming the gateway to determine a desired route over one of the PBX, PSTN, or data network for transmitting said call; and
  iv) programming the gateway to determine the availability of said desired route if said desired route is over the data network and programming the gateway to determine a re-direct route for said call over the PSTN if said desired route over the data network is not available; and b) categorizing said call as an:
  i) inbound national long distance call from the data network wherein a desired route is over the PBX if said termination number begins with a one, is followed by three digits that match the enterprise three digit area code, and is followed by at least three digits that match the enterprise at least three digit switch code;
  ii) outbound national long distance enterprise call from the PBX wherein a desired route is over the network if said termination number begins with a one and is followed by a three digit area code and an at least three digit switch code that match a three digit area code and an at least three digit switch code from one of said enterprise numbers from said national enterprise list; or
  iii) inbound call from the PSTN wherein a desired route is over the PBX if said termination number has fewer than seven digits.

13. A dial plan as in claim 12; wherein said dial plan further comprises:
a) a national leak list, said national leak list comprising a list of at least a national leak number, said national leak number comprising at least a three digit area code; and
b) the step of categorizing said call further comprising categorizing said call as an:
  i) outbound national leaking call from the PBX wherein a desired route is over the data network if said termination number begins with a one and is followed by three digits that match said at least three digit area code from one of said national leak numbers on said national leak list;
  ii) inbound national leaking call from the data network wherein a desired route is over the PSTN if said termination number begins with a one followed by three digits that match the enterprise area code followed by at least three digits that do not match the enterprise at least three digit switch number; or
  iv) outbound national long distance call from the PBX wherein a desired route is over the PSTN if said termination number begins with a one and is not categorized as a said inbound national leaking call, a said outbound national leaking call, a said inbound national long distance call, or a said outbound national long distance enterprise call.

14. A dial plan as in claim 12, wherein the dial plan further comprises:
a) an international outbound enterprise list comprising a list of at least one international outbound enterprise number, said at least one international out bound enterprise number comprising a country code, followed by a foreign area code, followed by a foreign switch code;
b) an international inbound list having at least an inbound international number, said inbound international number comprising an at least two digit international direct dial access code; and
c) the step of categorizing said call further comprising categorizing said call as an:
  i) outbound inter national enterprise call from the PBX wherein a desired route is over the data network if the first three digits of said termination number are 011 and are followed by a country code, a foreign area code, and a foreign switch code that match said country code, said foreign are a code, and said foreign switch code from one of said at least one enterprise number from said international outbound enterprise list; or
  ii) international inbound call from the data network wherein a desired route is over the PBX if said termination number has an at least two digit prefix that matches said at least two digit international direct dial access code from one of said at least one inbound international number from said international inbound list.

15. A dial plan as in claim 14, wherein said dial plan further comprises:
a) an international leak list comprising a list of international leak numbers, each of said international leak numbers having a country code, followed by a foreign area code; and
b) the step of categorizing said call further comprising categorizing said call as an:
  i) outgoing international leak call from the PBX wherein a desired route is over the data network if said termination number has three first digits of 011 followed by a country code and a foreign area code that match said country code and said foreign area code from one of said foreign leak numbers on said foreign leak list;
  ii) outgoing international call from the PBX wherein a desired route is over the PSTN if said termination number has three first digits of 011 and said call is not classified as a said outgoing international enterprise call or a said outgoing international leak call;
  iii) incoming international enterprise call from the data network wherein a desired route is over the PBX if said terminating number has an at least two digit prefix that matches said at least two digit international direct dial access code from one of said at least one inbound international number from said international inbound list, followed by a country code, three digit area code, and at least three digit switch code that match the enterprise country code, three digit area code, and at least three digit switch code;

iv) incoming international local leaking call from the data network wherein a desired route is over the PSTN if said terminating number has an at least two digit prefix that matches said at least two digit international direct dial access code from one of said at least one inbound international number from said international inbound list followed by a country code and a three digit area code that match the enterprise country code and three digit area code, followed by an at least three digit switch code that does not match the enterprise at least three digit switch code; or v) incoming international long distance leaking call from the data wherein a desired route is over the PSTN if said terminating number has an at least two digit prefix that matches said at least two digit international direct dial access code from one of said at least one inbound international number from said international inbound list followed by a country code that matches the enterprise country code followed by a three digit area code that does not match the enterprise three digit area code.

16. A dial plan as in claim 15, wherein said dial plan further comprises categorizing said call as an:

i) incoming international for international leaking call from the data network wherein a desired route is over the PSTN if said terminating number has an at least two digit prefix that matches said at least two digit international direct dial access code from one of said at least one inbound international number from said international inbound list followed by a country code that does not match the enterprise country code.

17. A dial plan as in claim 12, wherein said dial plan further comprises a special list with at least one number; and wherein the step of categorizing the call further comprises categorizing said call as an outbound local call from the PBX wherein a desired route is over the PSTN if said termination number matches any of said at least one number on said special list.

18. A dial plan for a packet based voice system, the system having at least a gateway connected to a PBX at an enterprise, the gateway also connected to a PSTN and to a data network; the dial plan comprising the steps of:

i) receiving a call and querying said call for a termination number;

ii) using said termination number to determine if said call is:
(1) an intra-company call from over the data network wherein a desired route is over the PBX;
(2) a leaking call from the data network wherein a desired route is over the PSTN;
(3) a leaking call coming from the PBX wherein a desired route is over the data network; or
(4) an outbound call from the PBX wherein a desired route is over the PSTN;

b) programming the gateway to test said desired route if said desired route is over the data network to detect if said desired route is unavailable for transmitting said call, programming the gateway to determine a desired re-direct route over the PSTN if said desired route is not available.

19. An article for executing a dial plan for a packet based voice system, the system having at least a gateway connected to a PBX at an enterprise, the gateway also connected to a PSTN and to a data network; the article comprising:

a) a computer readable storage medium;
b) means recorded on said medium for receiving a call;
c) means recorded on said medium for querying said call for a termination number;
d) means recorded on said medium for using said termination number to determine if said call is:
(1) an intra-company call from over the data network wherein a desired route is over the PBX;
(2) a leaking call from the data network wherein a desired route is over the PSTN;
(3) a leaking call coming from the PBX wherein a desired route is over the data network; or
(4) an outbound call from the PBX wherein a desired route is over the PSTN; and
e) means recorded on s aid medium for testing said desired route if said first desired route is over the data network to detect if said first desired route is unavailable for transmitting said call, means recorded on said medium for determining a desired re-direct route over the PSTN if said desired route is not available.

20. A dial plan for a gateway in a packet based voice system, the gateway connected to a PBX at an enterprise, the gateway connected to a data network and to a PSTN; the enterprise having a three digit area code, an at least three digit switch code; the dial plan comprising:

a) a national enterprise list, said national enterprise list having at least an enterprise number; each of said at least an enterprise number having a three digit area code and an at least three digit switch code;
b) a national leak list, said national leak list having a list of at least one national leak number comprising at least a three digit area code;
c) an international outbound enterprise list, said international outbound enterprise list comprising a list having at least an international outbound enterprise number, said international outbound number having an at least two digit country code, followed by a foreign area code, followed by a foreign switch code;
d) an international inbound list, said international inbound list having at least an inbound international number, said inbound international number comprising an at least two digit international direct dial access code;
e) a special list; said special list comprising at least a number; and
f) programming the gateway to perform the steps of:
i) receiving a call; querying said call for a termination number; said termination number comprising at least an extension number; ii) using said termination number to categorize said call as an:
(1) inbound national long distance call from the data network wherein a desired route is over the PBX if said termination number begins with a one and is followed by three digits that match the enterprise three digit area code followed by at least three digits that match the enterprise at least three digit switch code;
(2) outbound national long distance enterprise call from the PBX wherein a desired route is over the data network if said termination number begins with a one and is followed by a three digit area code and an at least three digit switch code that match a three digit area code and an at least three digit switch code from one of said at least an enterprise number from said national enterprise list;

(3) special call from the PBX wherein a desired route is over the PSTN if said termination number is less than seven digits and matches one of said at least a special number from said special list;

(4) inbound call from the PSTN wherein a desired route is over the PBX if said termination number has fewer than seven digits and is not categorized as a said special call;

(5) outbound national leaking call from the PBX wherein a desired route is over the data network if said termination number begins with a one and is followed by three digits that match said at least three digit area code from one of said at least a national leak numbers from said national leak list;

(6) inbound national leaking call from the data network wherein a desired route is over the PSTN if said termination number begins with a one followed by three digits that match the enterprise area code followed by at least three digits that do not match the enterprise at least three digit switch number;

(7) outbound national long distance call from the PBX wherein a desired route is over the PSTN if said termination number begins with a one and is not categorized as a said inbound national leaking call, a said outbound national leaking call, a said inbound national long distance call, or a said outbound national long distance enterprise call;

(8) outbound international enterprise call from the PBX wherein a desired route is over the data network if the first three digits of said termination number are 011 and are followed by an at least two digit country code, a foreign area code, and a foreign switch code that match said at least two digit country code, said foreign area code, and said foreign switch code from one of said enterprise numbers from said international outbound enterprise list;

(9) outbound international leak call from the PBX wherein a desired route is over the data network if said termination number has three first digits of 011 followed by a country code and a foreign area code that match said country code and said foreign area code from one of said at least a foreign leak numbers on said foreign leak list;

(10) outbound international call from the PBX wherein a desired route is over the PSTN if said termination number has three first digits of 011 and said call is not classified as a said outgoing international enterprise call or a said outgoing international leak call;

(11) inbound international call from the data network wherein a desired route is over the PBX if said terminating number has more than 10 digits and has an at least two digit prefix that matches said at least two digit international direct dial access code from one of said at least an inbound international number from said international inbound list followed by a country code, a three digit area code, and an at least three digit switch code that match the country code, three digit area code, and at least three digit switch code of the enterprise;

(12) inbound international local leaking call from the data network wherein a desired route is over the PSTN if said terminating number has more than ten digits beginning with an at least two digit prefix that matches said at least two digit international direct dial access code from one of said at least one inbound international number from said international inbound list, followed by a country code and an area code that match the enterprise country code and area code, and said terminating number having an at least three digit switch code following the three digit area code that does not match the enterprise at least three digit switch code; or

(13) incoming international long distance leaking call from the data network wherein a desired route is over the PSTN if said terminating number has more than ten digits beginning with an at least two digit prefix that matches said at least two digit international direct dial access code from one of said at least an inbound international number from said inbound international list, followed by a country code that matches the enterprise country code, followed by a three digit area code that does not match the enterprise area code;

iii) truncating said termination number to:
(1) said extension number if said call is categorized as a said inbound national long distance call or a said inbound international call;
(2) an at least three digit switch code and said at least an extension code if said call is categorized as a said inbound national leaking call or a said international inbound local leaking call;
(3) said at least three digit area code, said at least three digit switch code, and said extension number if said call is categorized as a said inbound international long distance leaking call;

iv) testing said desired route if said desired route is over the data network to detect if said desired route is unavailable for transmitting said call, and determining a desired re-direct route over the PSTN if said desired route is unavailable.

21. An article for executing a dial plan for a packet based voice system, the packet based voice system comprising at least a gateway connected to a PBX at an enterprise, the gateway connected to a data network and to a PSTN; the enterprise having a three digit area code and an at least three digit switch code; the article comprising:

a) a computer readable storage medium;
b) a national enterprise list recorded on said medium, said national enterprise list having at least an enterprise number having a three digit area code and an at least three digit switch code;
c) a national leak list recorded on said medium, said national leak list having a list of at least one national leak number comprising at least a three digit area code;
d) an international outbound enterprise list recorded on said medium, said international outbound enterprise list comprising a list having at least an international outbound enterprise number having an at least two digit country code, followed by a foreign area code, followed by a foreign switch code;
e) an international inbound list recorded on said medium, said international inbound list having at least an inbound international Number comprising an at least two digit international direct dial access code;
f) a special list recorded on said medium comprising at least a number; and
g) means recorded on said medium for executing the steps of:
i) receiving a call and querying said call for a termination number comprising at least an extension number;

ii) using said termination number to categorize said call as an:
  (1) inbound national long distance call from the data network wherein a desired route is over the PBX if said termination number begins with a one and is followed by three digits that match the enterprise three digit area code followed by at least three digits that match the enterprise at least three digit switch code;
  (2) outbound national long distance enterprise call from the PBX wherein a desired route is over the data network if said termination number begins with a one and is followed by a three digit area code and an at least three digit switch code that match a three digit area code and an at least three digit switch code from one of said at least an enterprise number from said national enterprise list;
  (3) special call from the PBX wherein a desired route is over the PSTN if said termination number is less than seven digits and matches one of said at least a special number from said special list;
  (4) inbound call from the PSTN wherein a desired route is over the PBX if said termination number has fewer than seven digits and is not categorized as a said special call;
  (5) outbound national leaking call from the PBX wherein a desired route is over the data network if said termination number begins with a one and is followed by three digits that match said at least three digit area code from one of said at least a national leak numbers from said national leak list;
  (6) inbound national leaking call from the data network wherein a desired route is over the PSTN if said termination number begins with a one followed by three digits that match the enterprise area code followed by at least three digits that do not match the enterprise at least three digit switch number;
  (7) outbound national long distance call from the PBX wherein a desired route is over the PSTN if said termination number begins with a one and is not categorized as a said inbound national leaking call, a said outbound national leaking call, a said inbound national long distance call, or a said outbound national long distance enterprise call;
  (8) outbound international enterprise call from the PBX wherein a desired route is over the data network if the first three digits of said termination number are 011 and are followed by an at least two digit country code, a foreign area code, and a foreign switch code that match said at least two digit country code, said foreign area code, and said foreign switch code from one of said enterprise numbers from said international outbound enterprise list;
  (9) outbound international leak call from the PBX wherein a desired route is over the data network if said termination number has three first digits of 011 followed by a country code and a foreign area code that match said country code and said foreign area code from one of said at least a foreign leak numbers on said foreign leak list;
  (10) outbound international call from the PBX wherein a desired route is over the PSTN if said termination number has three first digits of 011 and said call is not classified as a said outgoing international enterprise call or a said outgoing international leak call;
  (11) inbound international call from the data network wherein a desired route is over the PBX if said terminating number has more than 10 digits and has an at least two digit prefix that matches said at least two digit international direct dial access code from one of said at least an inbound international number from said international inbound list followed by a country code, a three digit area code, and an at least three digit switch code that match the country code, three digit area code, and at least three digit switch code of the enterprise;
  (12) inbound international local leaking call from the data network wherein a desired route is over the PSTN if said terminating number has more than ten digits beginning with an at least two digit prefix that matches said at least two digit international direct dial access code from one of said at least one inbound international number from said international inbound list, followed by a country code and an area code that match the enterprise country code and area code, and said terminating number having an at least three digit switch code following the three digit area code that does not match the enterprise at least three digit switch code; or
  (13) incoming international long distance leaking call from the data network wherein a desired route is over the PSTN if said terminating number has more than ten digits beginning with an at least two digit prefix that matches said at least two digit international direct dial access code from one of said at least an inbound international number from said inbound international list, followed by a country code that matches the enterprise country code, followed by a three digit area code that does not match the enterprise area code;
iii) truncating said termination number to:
  (1) said extension number if said call is categorized as a said inbound national long distance call or a said inbound international call;
  (2) an at least three digit switch code and said at least an extension code if said call is categorized as a said inbound national leaking call or a said international inbound local leaking call;
  (3) said at least three digit area code, said at least three digit switch code, and said extension number if said call is categorized as a said inbound international long distance leaking call;
iv) testing said desired route if said desired route is over the data network to detect if said desired route is unavailable for transmitting said call, and determining a desired re-direct route over the PSTN if said desired route is unavailable.

* * * * *